United States Patent
Watanabe et al.

(10) Patent No.: US 8,295,393 B2
(45) Date of Patent: Oct. 23, 2012

(54) DEVICE AND METHOD FOR TRANSMITTING/RECEIVING PULSE SIGNAL

(75) Inventors: Kenichi Watanabe, Nishinomiya (JP); Yasunobu Asada, Nishinomiya (JP); Shinji Ogawa, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 869 days.

(21) Appl. No.: 12/232,104

(22) Filed: Sep. 10, 2008

(65) Prior Publication Data

US 2009/0103595 A1 Apr. 23, 2009

(30) Foreign Application Priority Data

Sep. 11, 2007 (JP) ................... 2007-235110

(51) Int. Cl.
*H04K 1/02* (2006.01)
*H04L 25/03* (2006.01)
(52) U.S. Cl. .................. 375/296; 375/284; 375/254
(58) Field of Classification Search .............. 375/296, 375/325, 257, 299, 320
See application file for complete search history.

(56) References Cited

U.S. PATENT DOCUMENTS

| | | | |
|---|---|---|---|
| 6,950,372 B2 * | 9/2005 | Sogaard | 367/99 |
| 7,215,599 B2 * | 5/2007 | Nishimori et al. | 367/138 |
| 2004/0034305 A1 | 2/2004 | Song et al. | |
| 2008/0310479 A1 * | 12/2008 | Koslar et al. | 375/131 |

FOREIGN PATENT DOCUMENTS

| | | |
|---|---|---|
| EP | 1 214 910 A1 | 6/2002 |
| JP | 58-73345 A | 5/1983 |
| JP | 2003-325506 | 11/2003 |
| JP | 2004-177276 | 6/2004 |
| JP | 2004-271377 A | 9/2004 |
| JP | 3575252 | 10/2004 |
| JP | 2005-249398 | 9/2005 |
| WO | WO-00/57769 A3 | 10/2000 |

* cited by examiner

*Primary Examiner* — David Ometz
*Assistant Examiner* — Qutbuddin Ghulamali
(74) *Attorney, Agent, or Firm* — Birch, Stewart, Kolasch & Birch, LLP

(57) ABSTRACT

A pulse signal transmitting/receiving device is provided. The device includes a signal generating module for generating a transmitting signal including an amplitude-modulated chirp signal, and a reference signal including a chirp signal having a frequency that changes similarly to that of the transmitting signal, a transmitting module for transmitting a pulse having approximately the same waveform as that of the transmitting signal, a receiving module for receiving an echo signal that is the transmitting pulse reflected from a detection target object, a compensating module for extending a dynamic range of the echo signal received by the receiving module, and a pulse compressing module for outputting a pulse-compressed echo signal, wherein the pulse compression is performed by a correlation calculation between the echo signal having the dynamic range extended by the compensating module, and the reference signal.

4 Claims, 9 Drawing Sheets

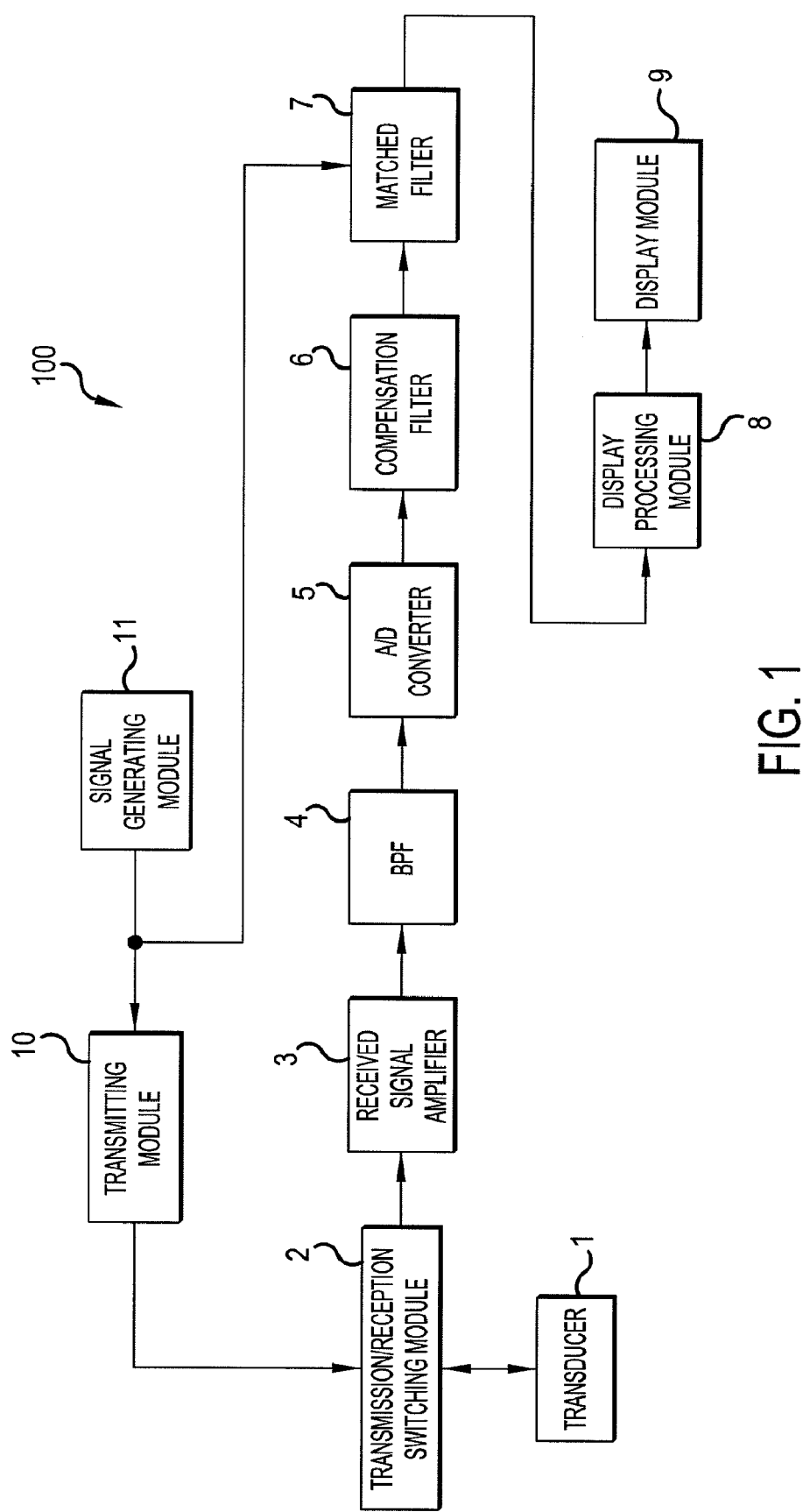

INPUT SIGNAL OF MATCHED FILTER (ENVELOP CURVE)
— PW=0.5ms DR=30dB
— PW=1ms DR=40dB

OUTPUT SIGNAL OF MATCHED FILTER
— PW=0.5ms DR=30dB
— PW=1ms DR=40dB

DEVICE AND METHOD FOR TRANSMITTING/RECEIVING PULSE SIGNAL

CROSS-REFERENCE TO RELATED APPLICATION(S)

This application claims priority under 35 U.S.C. §119 to Japanese Patent Application No. 2007-235110, which was filed on Sep. 11, 2007, the entire disclosure of which is hereby incorporated by reference.

TECHNICAL FIELD

The present invention relates to a pulse signal transmitting/receiving device and method for receiving an echo signal for a transmitted pulse, and applying a pulse compressing process to the received echo signal.

BACKGROUND

Among signal transmitting/receiving devices, a fish finder typically transmits an ultrasonic pulse from a transducer into water, and then receives an echo signal that is the transmitted pulse reflected from a school of fish or the ocean floor with the transducer. The fish finder then analyzes the received signal to display an image of the school of fish or the ocean floor on an appropriate location of a display module.

For this reason, the followings are typically required for such a fish finder: a wide detectable range, and a high signal-to-noise (SN) ratio and a high time resolution of the echo signal. However, if a transmitting pulse width is decreased to cause the time resolution to be higher, the detectable range and the S/N ratio will also be reduced. On the other hand, if the transmitting pulse width is increased to increase the detectable range and the S/N ratio, the time resolution will be reduced.

Thus, Japanese Unexamined Patent Application Publication No. 2005-249398 (e.g., [0010]-[0016] and [0026]-[0031]) proposes that a desired detectable range, S/N ratio, and time resolution can be realized by using a chirp signal (i.e., a FM signal having a signal frequency that is swept with time) as the transmitting pulse, and applying a pulse compression to the echo signal with a matched filter.

Japanese Patent No. 3575252 (e.g., [0016]-[0056]) utilizes a similar technique in ultrasonic flaw detection for a metal plate or pipe. Further, for ultrasonic diagnostic devices, Japanese Unexamined Patent Application Publication No. 2003-325506 (e.g., [0001]-[0013]) proposes that a compensation for canceling frequency characteristics of a transducer is applied to a transmitting pulse in advance so that an ideal echo signal for the pulse compressing process is received with the transducer.

It is desirable that a drive circuit of a transducer for transmitting the pulse has a high power efficiency, and can be manufactured at low cost. Thus, Japanese Unexamined Patent Application Publication No. 2004-177276 (e.g., [0046]-[0056]) proposes that a transducer is driven by a PDM (Pulse Duration Modulation) signal.

FIG. 7A illustrates a drive circuit 50 of the transducer disclosed in Japanese Unexamined Patent Application Publication No. 2004-177276. FIG. 7B illustrates signals from respective components of the drive circuit shown in FIG. 7A, and the transmitting pulse. When gate signals shown in upper part of FIG. 7B are inputted into the respective gates (not illustrated) of four FETs ($FET_1$-$FET_4$), a PDM signal is applied to both ends of a transducer 1 to cause the transducer 1 to transmit a sinusoidal pulse as show in the bottom of FIG. 7B. A frequency of the transmitting pulse can be decreased/increased by increasing/decreasing cycles $T_A$ of the gate signals, and amplitude of the transmitting pulse can be increased/decreased by increasing/decreasing duty ratios $T_B/T_A$ of the gate signals (here, $T_B$ is a pulse width of the gate signal).

FIG. 8 illustrates a transmitting pulse with a chirp signal that is generated as described above. Dashed lines are envelop curves of the transmitting pulse. A dynamic range of the transmitting pulse is represented by $20 \cdot \log(V_H/V_L)$ (here, $V_H$ is the maximum amplitude value of the transmitting pulse, and $V_L$ is the minimum amplitude value).

However, as shown in FIG. 9, in the above-described conventional transmitting/receiving devices, because range side lobes periodically appear in the front and the rear of a main lobe of the pulse-compressed echo signal in the temporal axis direction, false images caused by the range side lobes are displayed on the display module. For example, the false images from the ocean floor caused by the range side lobes of the echo signal overlap on an image of a school of fish which is located in proximity to the ocean floor. As a result, the school of fish may not be detected.

As a technique for suppressing the range side lobes, it is known that a chirp signal (refer to FIG. 8) to which the amplitude modulation by a Gaussian function is applied is used as the transmitting pulse. In this technique, the more the dynamic range of the transmitting pulse is extended, the more the amplitude of the range side lobes can be decreased. However, because a realizable breadth of the dynamic range may be limited by performance of a transmitting module having the drive circuit 50 of the transducer 1, the suppression of the range side lobes by this technique may also be limited. For example, if the transducer 1 is driven by a PDM signal to transmit a pulse of 20 kHz carrier frequency, which is widely used for fish finders, the dynamic range will be limited to approximately 25-30 dB at maximum depending on a switching rate of the FETs. Further, waveform distortions (i.e., a difference between an ideal chirp signal waveform and a transmitting pulse waveform) may be caused to the transmitting pulse due to a finite amplitude/time resolution of hardware of the transmitting module, or frequency characteristics of the transducer 1. This also causes the increased range side lobes.

As another technique for suppressing the range side lobes, it is known that a product of "B" and "T" (hereinafter, simply referred to as a "BT product") of the transmitting pulse having a chirp signal ("B" is a frequency sweep width of the transmitting signal, and "T" is a transmitting pulse width) is extended. In the fish finders, the transmitting pulse width is typically reduced to increase the transmitting cycle in a shallow water area. At this point, for suppressing the range side lobes, it is necessary that the frequency sweep width is increased to maintain the BT product to be greater than a predetermined value. However, increasing the frequency sweep width is limited by the frequency characteristics of the transducer 1. Further, this is not desirable because interferences between a transmitting pulse from a fish finder of one vessel, and a transmitting pulse from another fish finder of another vessel may be caused. On the other hand, if the transmitting pulse width is increased to maintain the BT product to be greater than the predetermined value, the following problem may be caused: electrical load of the drive circuit 50 of the transducer 1 is increased, or an echo signal detection range is narrowed in a shallow water area. The above-described two problems on the technique for suppressing the range side lobes may also be caused in other underwater detection devices (other than the fish finders), as well as in ultrasonic testing devices, ultrasonic diagnostic devices, or wireless radars, etc.

SUMMARY

The present invention addresses the above-described issues, and provides an improved pulse signal transmitting/receiving device and method.

According to an aspect of the present invention, a pulse signal transmitting/receiving device includes a signal generating module for generating a transmitting signal including an amplitude-modulated chirp signal, and a reference signal including a chirp signal having a frequency that changes similarly to that of the transmitting signal, a transmitting module for transmitting a pulse having approximately the same waveform as that of the transmitting signal, a receiving module for receiving an echo signal that is the transmitting pulse reflected from a detection target object, a compensating module for extending a dynamic range of the echo signal received by the receiving module, and a pulse compressing module for outputting a pulse-compressed echo signal. The pulse compression is performed by a correlation calculation between the echo signal having the dynamic range extended by the compensating module, and the reference signal.

The compensating module may remove waveform distortions from the echo signal received by the receiving module.

The compensating module may have input/output characteristics that are determined based on a system function $G(f)$ obtained by dividing a Fourier transform $X(f)$ of a signal $x(t)$ similar to the reference signal by a Fourier transform $S(f)$ of a signal $s(t)$ similar to the transmitting signal.

If the transmitting signal and the reference signal have the same dynamic range, the transmitting signal and the reference signal may be amplitude-modulated chirp signals having a similar waveform. The dynamic range of the reference signal may be greater than that of the transmitting signal.

The pulse signal transmitting/receiving device may further include a BT product extending module for extending only T, or both T and B of the BT product of the echo signal for the correlation calculation. Here, B may be a frequency sweep width, and T may be a pulse width. Instead of the reference signal having the frequency changing similarly to the transmitting signal, the signal generating module may generate a reference signal that has a frequency changing similarly to a BT product extended signal, and has approximately the same pulse width as that of the BT product extended signal. The BT product extended signal may be a resultant signal where the BT product of the transmitting signal is extended in the same manner as the extension of the BT product.

The pulse signal transmitting/receiving device may further include a BT product extending module for extending only B of the BT product of the echo signal for the correlation calculation. Here, B may be a frequency sweep width, and T may be a pulse width. Instead of the reference signal having the frequency changing similarly to the transmitting signal, the signal generating module generates a reference signal that has a frequency changing similarly to a BT product extended signal, and has approximately the same pulse width as that of the BT product extended signal. The BT product extended signal may be a resultant signal where the BT product of the transmitting signal is extended in the same manner as the extension of the BT product.

If the BT product extended signal and the reference signals have the same dynamic range, the BT product extended signal and the reference signals may be amplitude-modulated chirp signals having a similar waveform. The dynamic range of the reference signal may be greater than that of the BT product extended signal.

According to another aspect of the present invention, a pulse signal transmitting/receiving method includes generating a transmitting signal including an amplitude-modulated chirp signal, and a reference signal including a chirp signal having a frequency that changes similarly to that of the transmitting signal, transmitting a pulse having approximately the same waveform as that of the transmitting signal, receiving an echo signal that is the transmitting pulse reflected from a detection target object, extending a dynamic range of the received echo signal, and outputting a pulse-compressed echo signal by performing a correlation calculation between the echo signal having the extended dynamic range and the reference signal.

BRIEF DESCRIPTION OF THE DRAWINGS

The present disclosure is illustrated by way of example and not by way of limitation in the figures of the accompanying drawings, in which the like reference numerals indicate like elements and in which:

FIG. 1 is a block diagram showing a configuration of a fish finder as an example of a pulse signal transmitting/receiving device according to an embodiment of the present invention;

DETAILED DESCRIPTION OF THE PREFERRED EMBODIMENT

Embodiment 1

FIG. 1 is a block diagram showing a configuration of a fish finder 100 as a pulse signal transmitting/receiving device according to an embodiment of the present invention. As used herein, the pulse signal transmitting/receiving device includes an underwater detection device, such as the fish finder, sonar, etc., as well as an ultrasonic testing device, an ultrasonic diagnostic device, and a wireless radar device, etc.

This fish finder 100 transmits an ultrasonic pulse from a transducer 1 downwardly (e.g., toward the ocean floor), and the receives an echo signal that is a transmitting pulse reflected from an object, such as a school of fish, the ocean floor, etc., with the transducer 1. The fish finder 100 displays an image of the object on a display module 9 based on a result of a calculation process applied to the received echo signal. Hereinafter, the configuration and operation of the fish finder 100 will be described.

Figure 8:
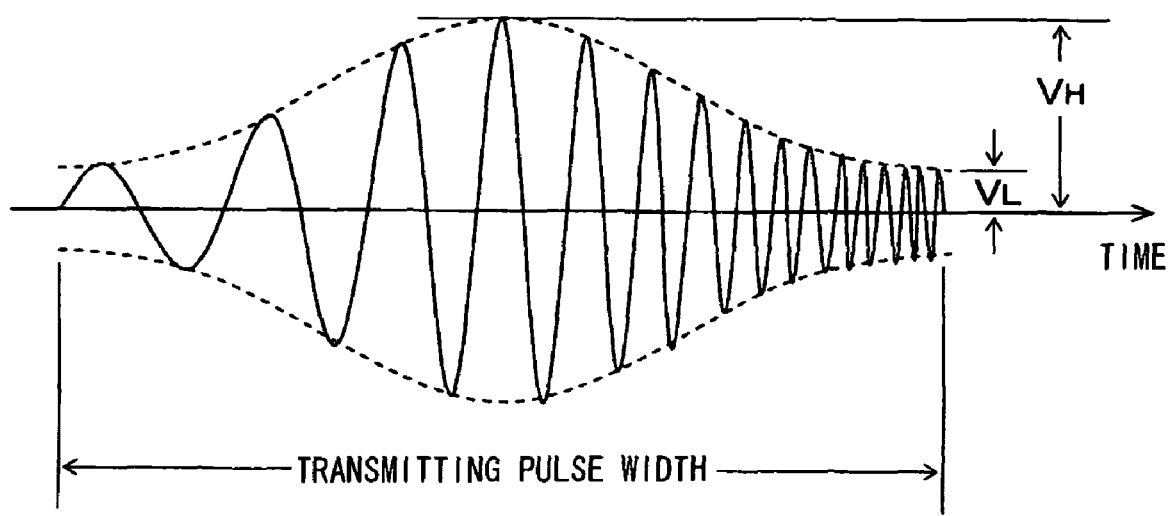
FIG. 8 is a graph showing the transmitting pulse with a chirp signal.
Figure 9:
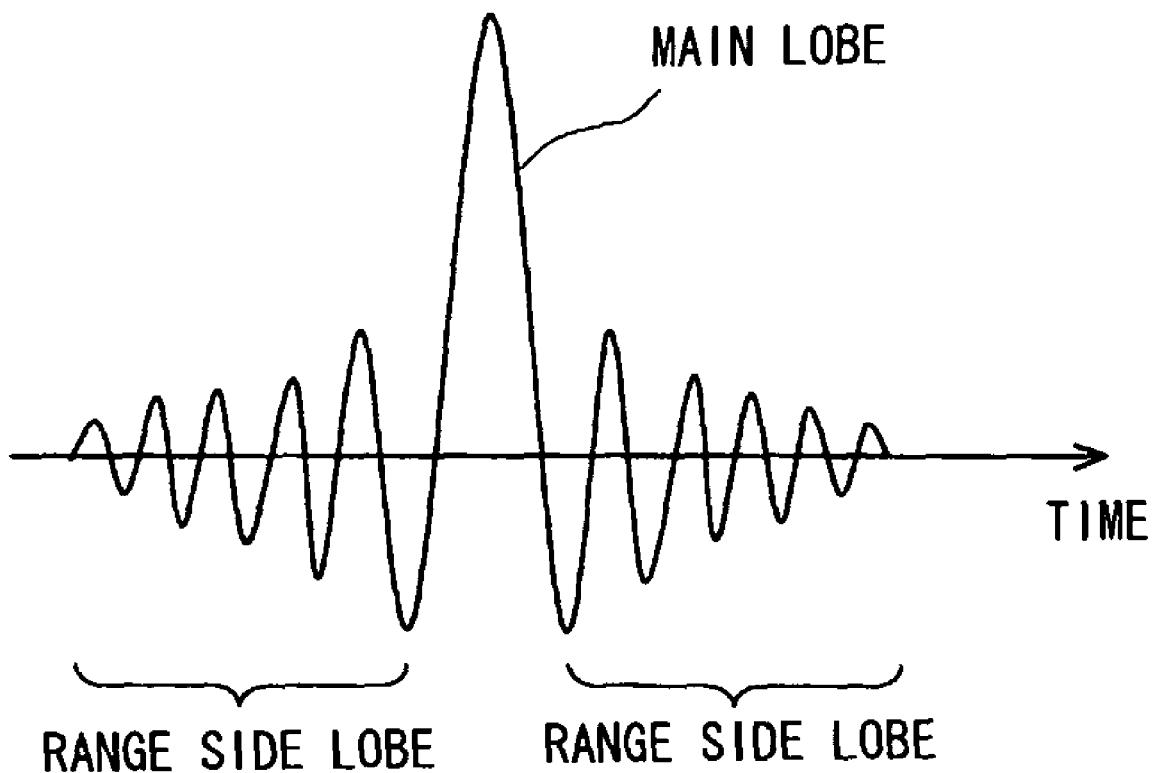
FIG. 9 is a graph showing an pulse-compressed echo signal.

A signal generating module 11 multiplies a chirp signal (a FM signal having a signal frequency that is swept with time) by a Gaussian function having a predetermined dynamic range, to generate a transmitting signal and a reference signal having frequencies that similarly change with smooth envelop curves, as a digital signal sequence. The function used for generating both the signals is not limited to the Gaussian function as described above, and may be any other function that can generate a transmitting signal and a reference signal having a waveform, such as that of a transmitting pulse shown in FIG. 8. If the transmitting signal and the reference signal generated in this manner have the same dynamic range, they may be amplitude-controlled chirp signals having similar waveforms. As used herein, "two signals are similar in waveform" means that multiplying of amplitude of one of the signals by a predetermined number results in amplitude of the other signal. The dynamic range of the reference signal is greater than that of the transmitting signal. Hereinafter, it is assumed that the dynamic range of the transmitting signal is 30 dB, and the dynamic range of the reference signal is 40 dB. As shown in FIG. 8, the dynamic range can be represented by $20 \cdot \log (V_H/V_L)$ (here, $V_H$ is the maximum amplitude value of the chirp signal, and $V_L$ is the minimum amplitude value). Further in this embodiment, the digital signal sequence of the reference signal is set in a coefficient memory (not illustrated) of a later-described matched filter 7, and it is used for a correlation calculation with the received echo signal.

Figure 7A:
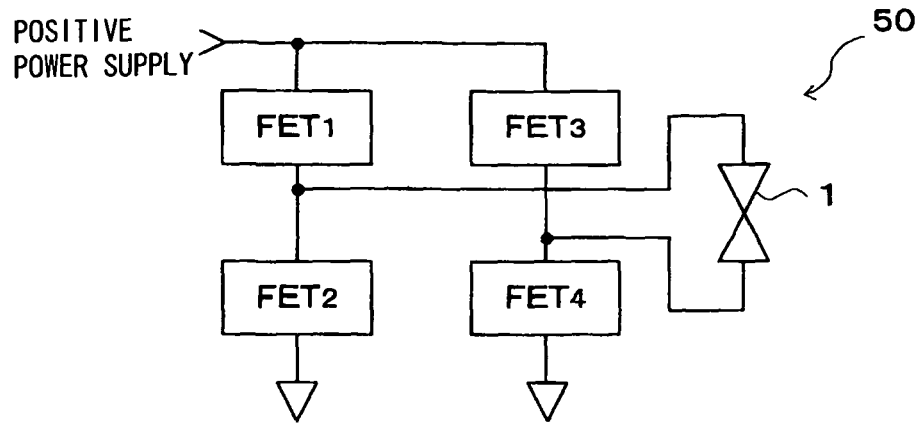
FIG. 7A is a block diagram showing a drive circuit of a transducer.
Figure 7B:
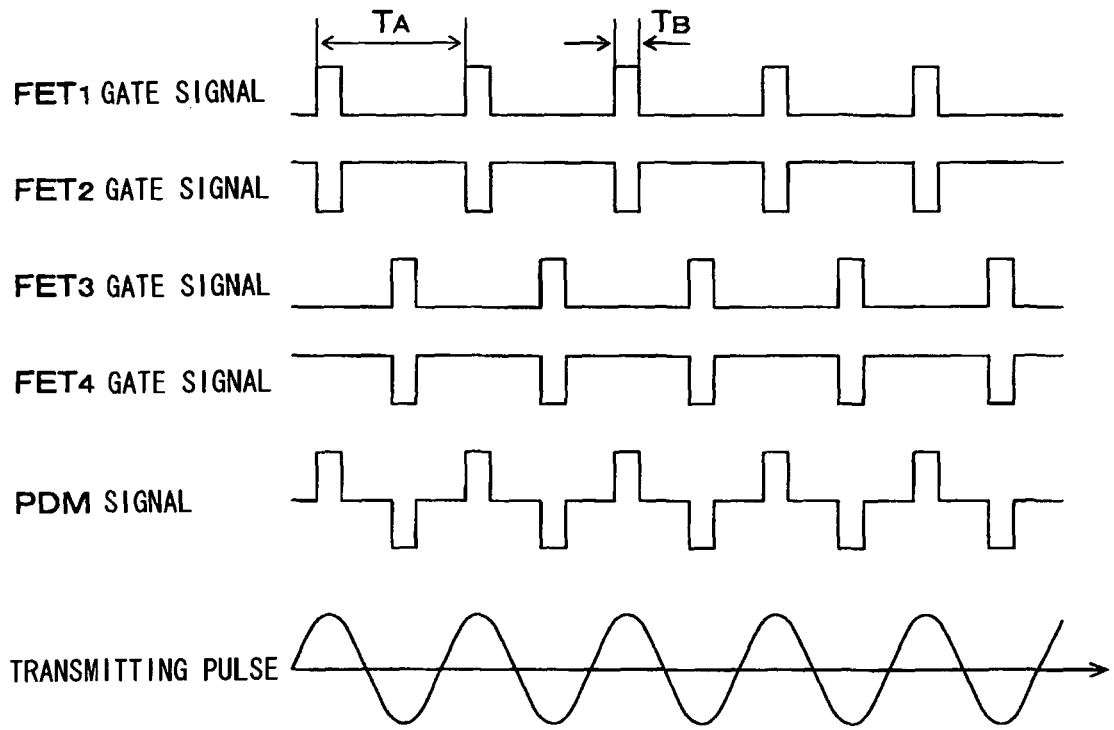
FIG. 7B is a timing chart showing signals of the drive circuit, and a transmitting pulse.

Returning to FIG. 1, a transmitting module 10 includes a transmitting signal converting module (not illustrated) and a drive circuit 50 shown in FIG. 7A. The transmitting signal converting module converts the transmitting signal outputted from the signal generating module 11 into gate signals of four FETs ($FET_1$-$FET_4$). At this point, cycles $T_A$ of the gate signals (refer to FIG. 7B) and duty ratios $T_B/T_A$ (here, $T_B$ is a pulse width of the gate signal) are determined so that the waveform of the transmitting pulse from the transducer 1 is the same as that of the transmitting signal. Although an error may be caused to the cycle $T_A$ and the duty ratios $T_B/T_A$, the error typically is one of errors caused by a finite amplitude/time resolution of hardware of the transmitting module 10. When the gate signals outputted from the transmitting signal converting module are inputted to gates of the $FET_1$-$FET_4$ of the drive circuit 50, a PDM (Pulse Duration Modulation) signal is applied to both ends of the transducer 1 through a transmission/reception switching module 2. As a result, a pulse having approximately the same waveform as that of the transmitting signal is transmitted from the transducer 1. This transmitting pulse is a chirp signal with the dynamic range of 30 dB, as described above.

The transmitting pulse from the transducer 1 is reflected from the ocean floor, the school of fish, etc., and the echo signal is received by the transducer 1. The received echo signal is a chirp signal with the dynamic range of 30 dB, and is then amplified by a received signal amplifier 3 through the transmission/reception switching module 2. A BPF (Bandpass filter) 4 removes a frequency component as noises other than a predetermined frequency bandwidth from the amplified echo signal. Further, an A/D converter 5 samples the echo signals at a sampling cycle corresponding to the above-described cycle of the digital signal sequence of the transmitting signal and the reference signal.

A compensation filter 6 extends the dynamic range of the echo signal that is digitalized by the A/D converter 5 to reduce amplitudes of range side lobes, while removing waveform distortions included in the echo signal. If the dynamic range is extended from 30 dB to 40 dB by the compensation filter 6, an echo signal similar to the reference signal with a dynamic range of 40 dB is outputted from the compensation filter 6. That is, an ideal echo signal for a pulse compressing process by the matched filter 7 can be outputted. As used herein, the term "similar" means that multiplying of the amplitude of the output signal of the compensation filter 6 by a predetermined number results in the amplitude of the reference signal. The matched filter 7 performs the correlation calculation between the echo signal compensated by the compensation filter 6, and the reference signal set in the coefficient memory as a filter coefficient, to output the pulse-compressed echo signal.

As described above, the echo signal outputted from the compensation filter 6 and the reference signal are similar when the echo signal is from a point target, such as a single fish. On the other hand, for general echo signals from a school of fish, the ocean floor, etc., the echo signal outputted from the compensation filter 6 and the reference signal are not similar. However, because the general echo signals from the school of fish or the ocean floor can also be considered as an overlapped signal of the echo signals from a plurality of the point targets, the output signal of the matched filter 7 is a pulse compressed signal with the suppressed range side lobes. In this embodiment and in a later-described second embodiment, the echo signal from the point target will be described for clear understanding.

A display processing module 8 causes the display module 9 to display an image of the school of fish or the ocean floor based on the pulse-compressed echo signal. It is preferred that the chirp signal with the dynamic range of 40 dB is used as the reference signal. However, the chirp signal, the amplitude of which is not controlled, may be used as the reference signal, only where the frequencies of the reference signal and the transmitting signal similarly change.

Next, the compensation filter 6 will be described in detail. Here, it is assumed that an input signal of the compensation filter 6 is s(t), an output signal is x(t), and an impulse response is g(t). In addition, it is assumed that the waveform distortions included in the echo signal is linear and time-invariant. As shown in the following Equation (1), x(t) is calculated by a convolution integral of s(t) and g(t).

$$x(t)=s(t)*g(t) \tag{1}$$

Assuming that Fourier transforms of x(t), s(t), and g(t) are X(f), S(f), and G(f), respectively, a system function G(f) of the compensation filter 6 is represented by the following Equation (2).

$$G(f)=X(f)/S(f) \tag{2}$$

The output signal x(t) is a given signal similar to the reference signal. Therefore, if s(t) is obtained, G(f) can be calculated.

Here, an example of a method for experimentally obtaining s(t) will be described. First, the transducer 1 is placed on a bottom of a water tank (not illustrated) so that a wave transmitting/receiving surface of the transducer 1 faces upwardly. Then, a transmitting pulse is emitted toward a water surface from the transducer 1, and an echo signal from the water surface is received by the transducer 1. Further, s(t) is extracted from the echo signal that is digitalized by the A/D converter 5. A Fourier transform S(f) of the extracted s(t), and a Fourier transform X(f) of a given x(t) are then substituted into Equation (2) to calculate a system function G(f). An impulse response g(t) can be obtained by an inverse Fourier transform of G(f). Then, a filter coefficient of the compensation filter 6 as a digital filter is calculated from g(t) or G(f). By setting the calculated value in the coefficient memory, a configuration of the compensation filter 6 (i.e., an input/output characteristic) is determined.

The input signal s(t) obtained as described above is a signal approximately similar to the transmitting signal. However, s(t) may include not only the waveform distortions attributed to the finite amplitude/time resolution of the hardware of the transmitting module 10, but also the waveform distortions attributed to the frequency characteristics of the transducer 1, or the input/output characteristics of the received signal amplifier 3. Therefore, by using the compensation filter 6 set with the filter coefficient that is calculated from s(t), all of the above-described waveform distortions included in the actual echo signal can be removed. Alternatively, s(t) can be obtained by receiving a current signal of the PDM signal outputted from the transmitting module 10 with the received signal amplifier 3 through the transmission/reception switching module 2 that may be constituted with a transformer.

As described above, a compensation for extending the dynamic range of the echo signal, and a compensation for removing the waveform distortions from the echo signal are performed by the compensation filter 6. However, the amplitude of the range side lobes included in the output signal of the matched filter 7 can also be decreased only by performing the compensation for extending the dynamic range. In this case, the system function G(f) is calculated as follows. Here, it is assumed that a chirp signal with the dynamic range of 30 dB similar to the transmitting signal is s(t) (the input signal of the compensation filter 6), and a chirp signal with the dynamic range of 40 dB similar to the reference signal is x(t) (the output signal of the compensation filter 6). Fourier transforms S(f) and X(f) of these s(t) and x(t) are substituted into Equation (2) to calculate the system function G(f).

The fish finder 100 includes the compensation filter 6 and the matched filter 7. However, if a filter having a system function G(f)·H(f) is adopted, the compensation filter 6 and the matched filter 7 can be integrated. G(f) is a system function of the compensation filter 6, as described above. H(f) is a system function of the matched filter 7, and can be calculated from the reference signal set in the coefficient memory of the matched filter 7.

Figure 2A:
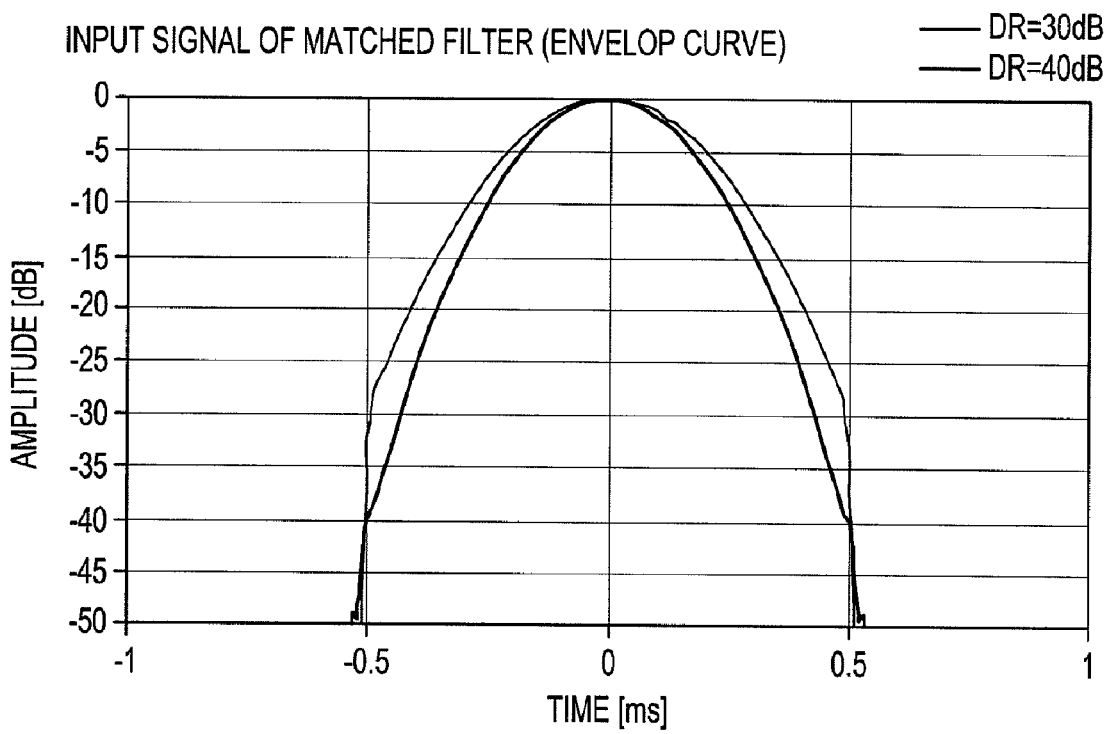
FIGS. 2A and 2B are graphs showing influences to output signals by a size of a dynamic range of a signal that is inputted to a matched filter.
Figure 2B:
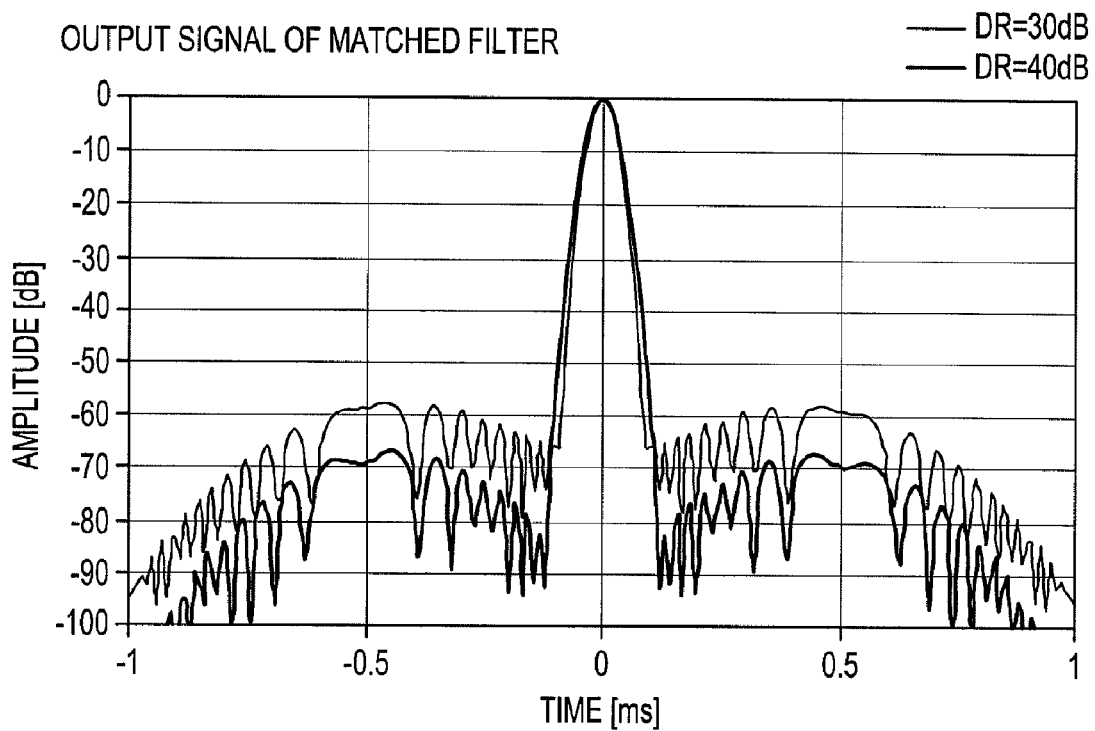

FIGS. 2A, and 2B are graphs showing influences to the output signal by a size the dynamic range of the signal inputted to the matched filter 7, and are obtained by a simulation. More specifically, FIG. 2A illustrates an envelop curve of the input signal with the dynamic range of 30 dB, and an envelop curve of the input signal with the dynamic range of 40 dB, that are inputted to the matched filter 7. Both input signals are the chirp signals having a pulse width of 1 ms without the waveform distortion. The frequency of the chirp signal is continuously increased from 175 kHz to 225 kHz (here, a center frequency is 200 kHz, and a frequency sweep width is 50 kHz). FIG. 2B illustrates the output signal of the matched filter 7 when the dynamic range of the input signal of the matched filter 7 is 30 dB, and when the dynamic range is 40 dB. From FIGS. 2A and 2B, it is understood that, if the dynamic range of the input signal of the matched filter 7 is extended from 30 dB to 40 dB, the amplitude of the range side lobes is reduced by approximately 10 dB.

Figure 3:
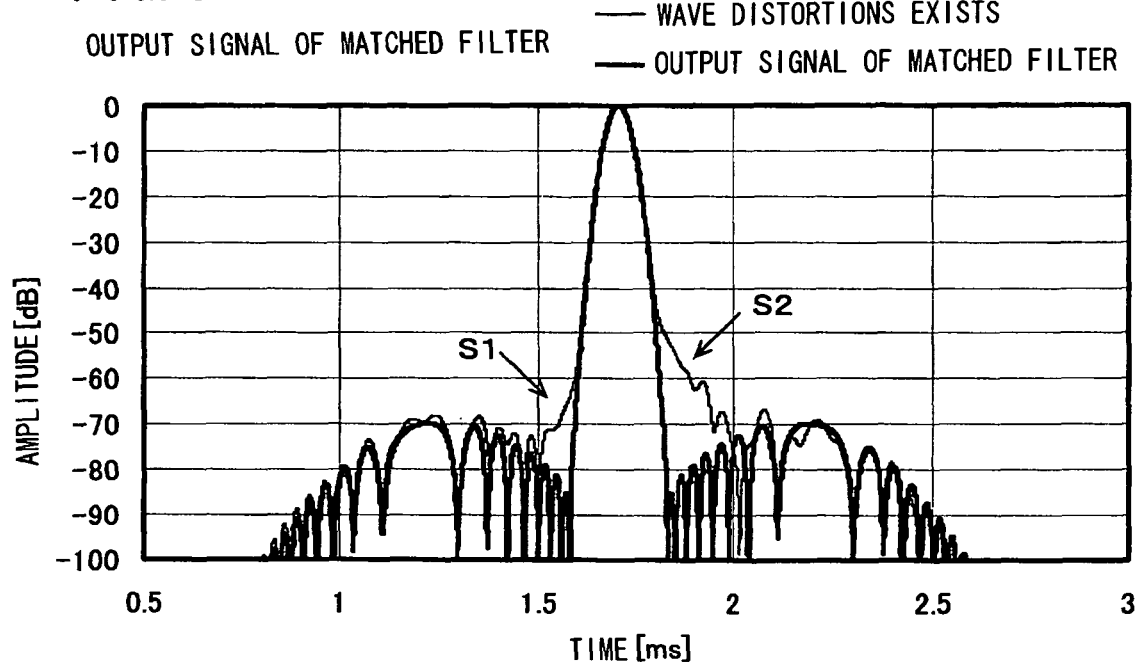
FIG. 3 is a graph showing influences to an output signal by presence of waveform distortions of a signal inputted to the matched filter.

FIG. 3 is a graph showing influences to the output signal by the existence of the waveform distortions of the signal inputted to the matched filter 7, and is obtained by a simulation. This graph illustrates the output signals of the matched filter 7 when the wave distortions exist in the input signal of the matched filter 7, and when the wave distortions do not exist. In this graph, the input signals of the matched filter 7 are not illustrated. However, the input signals are the chirp signals having the dynamic range of 40 dB, and the pulse width of 1 ms, regardless of the existence of the waveform distortions. The frequency of the chirp signal continuously increases from 175 kHz to 225 kHz. From FIG. 3, it is understood that, if the waveform distortions of the input signal of the matched filter 7 are removed, the amplitude of the range side lobes decreases at positions pointed by arrows S1 and S2.

As described above, by performing the compensation for extending the dynamic range of the echo signal by the compensation filter 6, the amplitude of the range side lobes included in the output signal of the matched filter 7 (i.e., the pulse-compressed echo signal) can be decreased. Therefore, false images caused by the range side lobes is cleared or reduced. In this case, because the dynamic range of the transmitting pulse is not necessarily extended, a problem in which the extension of the dynamic range of the transmitting pulse is limited by performance of the transmitting module 10 is not caused. In addition, by performing the compensation for removing the waveform distortions from the echo signal, the amplitude of the range side lobes can be further reduced.

Embodiment 2

Next, a second embodiment of the present invention will be described. In this embodiment, amplitude of the range side lobes is further decreased by extending a BT product ("B" is a frequency sweep width of the echo signal, and "T" is a pulse width of the echo signal) of the echo signal.

Figure 4:
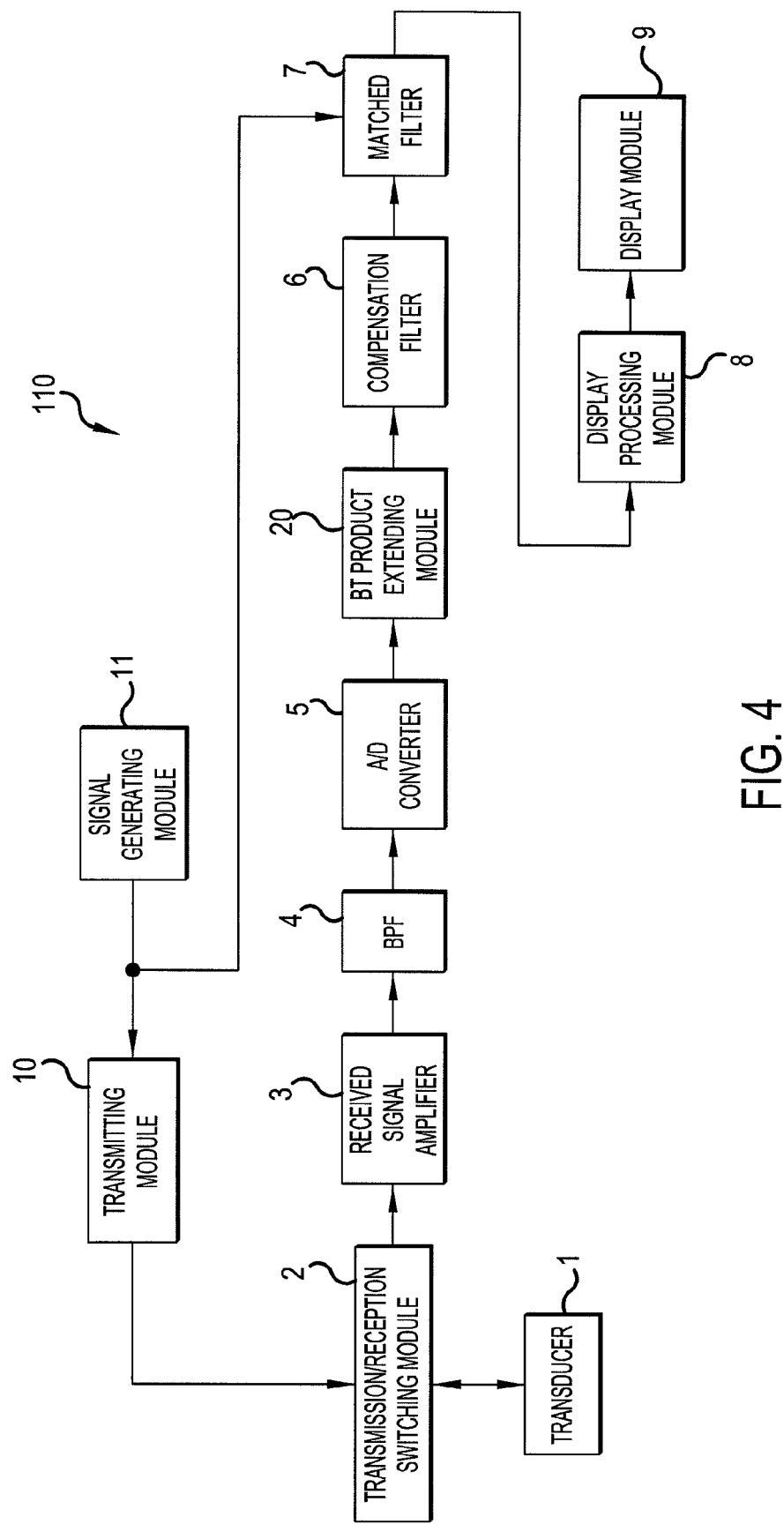
FIG. 4 is a block diagram showing a configuration of a fish finder according to a second embodiment of the invention.

FIG. 4 is a block diagram showing a configuration of a fish finder according to the second embodiment. The fish finder 110 is similar to the fish finder 100 shown in FIG. 1, other than a BT product extending module 20 is additionally provided between the A/D converter 5 and the compensation filter 6. The BT product extending module 20 may be arranged between the compensation filter 6 and the matched filter 7.

Figure 5A:
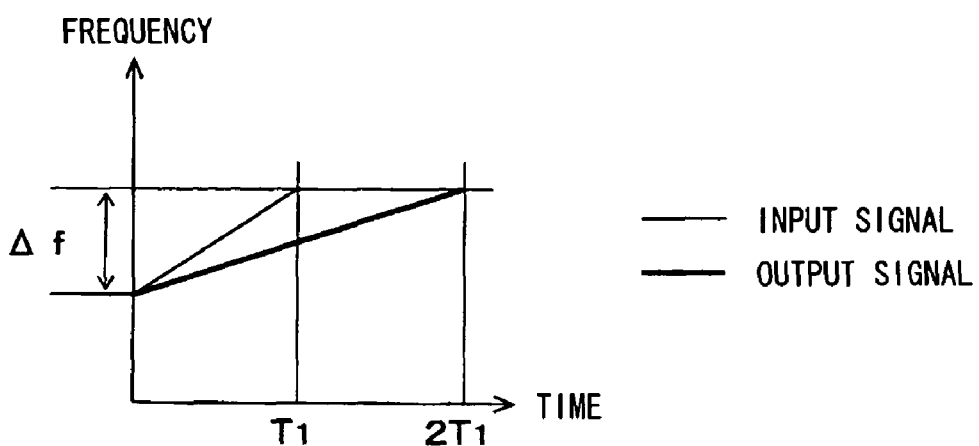
FIGS. 5A, 5B, and 5C are graphs showing input and output signals in a BT product extending module.
Figure 5B:
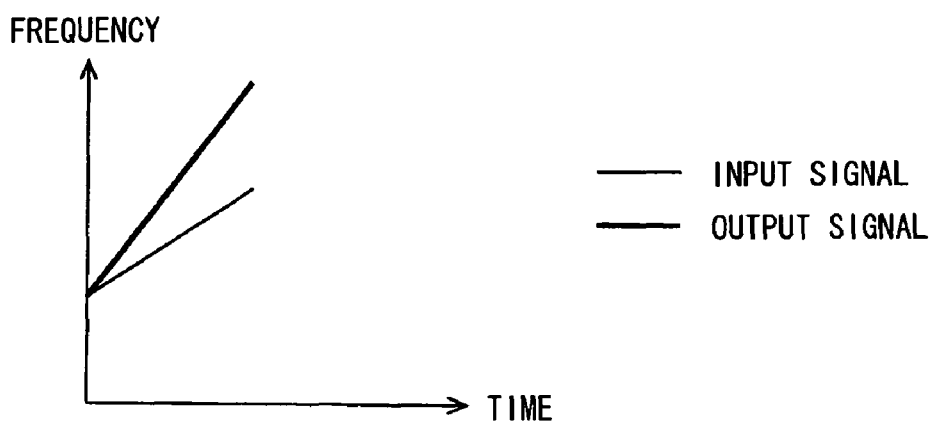
Figure 5C:
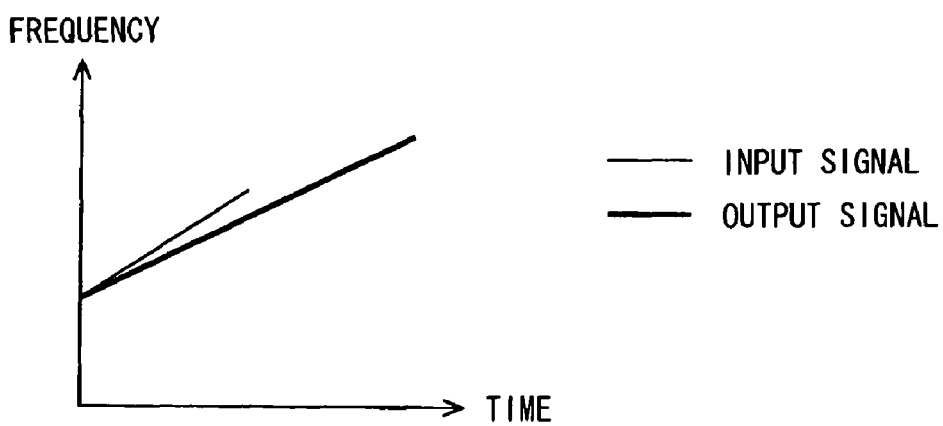

For example, as shown in FIG. 5A, the BT product extending module 20 converts the input signal having a pulse width $T_1$ and a frequency sweep width $\Delta f$ into a signal having a pulse width $2T_1$ and the frequency sweep width $\Delta f$, and then outputs the converted signal. That is, the BT product of the original echo signal is doubled. In this example, because the pulse width is doubled without changing the frequency sweep width, a frequency changing rate of the output signal of the BT product extending 20 is half that of the input signal. In the example of FIG. 5A, only the pulse width is extended. Alternatively, only the frequency sweep width may be extended (refer to FIG. 5B), or both of the pulse width and the frequency sweep width may be extended (refer to FIG. 5C). In any one of the cases of FIGS. 5A-5C, instead of the reference signal shown in the previous embodiment with the frequency that changes similarly to the transmitting signal, the signal generating module 11 generates a reference signal with a frequency that changes similarly to a signal, by which the BT product of the transmitting signal is extended in the same manner as the above-described extension of the BT product (hereinafter, referred to as a "BT product extended signal"), and that has approximately the same pulse width as that of the BT product extended signal.

Figure 6A:
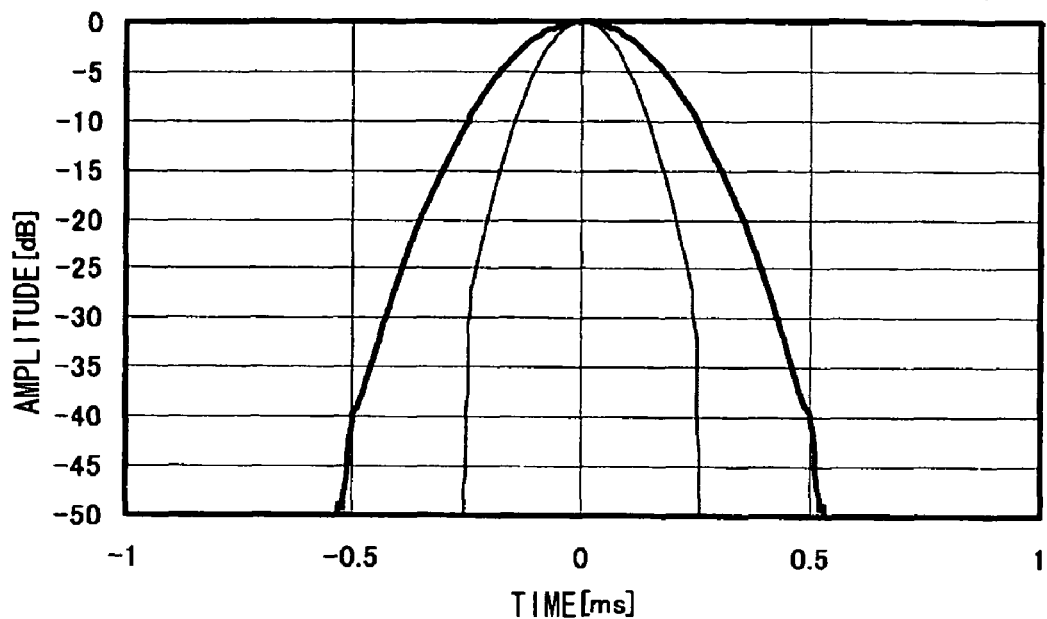
FIGS. 6A, and 6B are graphs showing influences to output signals by the BT product and a size of a dynamic range of a signal inputted to the matched filter.
Figure 6B:
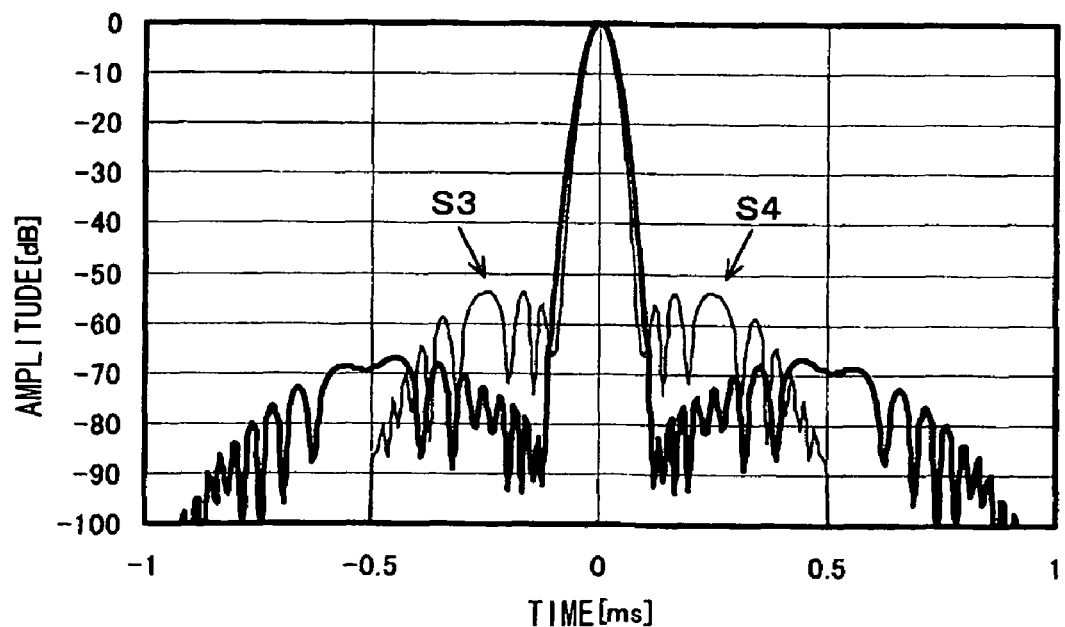

FIGS. 6A and 6B are graphs showing influences to an output signal by the BT product and the size of the dynamic range of a signal inputted to the matched filter 7, and are obtained by a simulation. More specifically, FIG. 6A illustrates an envelop curve of the input signal having the pulse width of 0.5 ms and the dynamic range of 30 dB, and an envelop curve of the input signal having the pulse width of 1 ms and the dynamic range of 40 dB, that are inputted to the matched filter 7. Both of the input signals are the chirp signals without the waveform distortions. The frequency of the chirp signal continuously increases from 175 kHz to 225 kHz. In the simulation, a signal used as the reference signal is such that it is an amplitude-modulated chirp signal having a waveform similar to that of the BT product extended signal if the signal and the BT product extended signal have the same dynamic range, and it has a greater dynamic range than 30 dB dynamic range of the BT product extended signal (or the transmitting signal). Here, the signal with the dynamic range of 40 dB is used. The BT product extended signal is a signal having a waveform similar to that of the echo signal that is a signal, BT product of which is extended.

FIG. 6B illustrates the output signal of the matched filter 7 when the input signals of the matched filter 7 have the pulse width of 0.5 ms and the dynamic range of 30 dB, and the pulse width of 1 ms and the dynamic range of 40 dB. From FIG. 6B, it is understood that, if the BT product (here, only the pulse width of the BT product) and the dynamic range of the input signal of the matched filter 7 are extended, the amplitude of the range side lobes is decreased at positions pointed by arrows S3 and S4. Further, if the output signal of the matched filter 7 for the input signal shown in FIG. 6B having the pulse width of 0.5 ms and the dynamic range of 30 dB, and the output signal of the matched filter 7 for the input signal shown in FIG. 2B having the dynamic range of 30 dB (the pulse width is 1 ms) are compared, it is understood that the amplitude of the range side lobes is decreased at the positions pointed by arrows S3 and S4, if the BT product (here, only the pulse width of the BT product) of the input signal of the matched filter 7 is increased.

As described above, by performing the compensation for extending at least the pulse width of the BT product of the echo signal (i.e., the compensation for extending only the pulse width, or both of the pulse width and the frequency sweep width) by the BT product extending module 20, the amplitude of the range side lobes included in the output signal of the matched filter 7 (i.e., the pulse-compressed echo signal) can be further decreased. In this case, because the transmitting pulse width is not necessarily increased, a problem in which an echo signal detection range is narrowed in a shallow water area is not caused.

Alternatively, if the compensation for extending only the frequency sweep width of the BT product of the echo signal is performed, the amplitude of the range side lobes included in the pulse-compressed echo signal can be further decreased. In this case, the frequency sweep width of the transmitting pulse is not necessarily increased, a problem in which the extension of the frequency sweep width is limited due to the frequency characteristics of the transducer 1 is not caused.

In the above-described embodiments, numerical values, such as of the pulse width of the transmitting pulse, and the dynamic range, are illustrated as examples. However, these numerical values may be appropriately changed to implement the present invention. Further, in the above-described embodiments, the transducer 1 is driven by the PDM signal to transmit the pulse. However, the transducer 1 may be driven by a signal other than the PDM signal.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A pulse signal transmitting/receiving device, comprising:
   a signal generating module for generating a transmitting signal including an amplitude-modulated chirp signal having a frequency that changes, and a reference signal including a chirp signal having a frequency that changes;
   a transmitting module for transmitting a pulse having approximately the same waveform as that of the transmitting signal;
   a receiving module for receiving an echo signal that is the transmitting pulse reflected from a detection target object;
   a compensating module for extending a dynamic range of the echo signal received by the receiving module; and
   a pulse compressing module for outputting a pulse-compressed echo signal, wherein the pulse compression is performed by a correlation calculation between the echo signal having the dynamic range extended by the compensating module, and the reference signal,
   wherein the compensating module has input/output characteristics that are determined based on a system function $G(f)$ obtained by dividing a Fourier transform $X(f)$ of a signal $x(t)$ similar to the reference signal by a Fourier transform $S(f)$ of a signal $s(t)$ similar to the transmitting signal.

2. A pulse signal transmitting/receiving device, comprising:
   a signal generating module for generating a transmitting signal including an amplitude-modulated chirp signal having a frequency that changes, and a reference signal including a chirp signal having a frequency that changes;

a transmitting module for transmitting a pulse having approximately the same waveform as that of the transmitting signal;

a receiving module for receiving an echo signal that is the transmitting pulse reflected from a detection target object;

a compensating module for extending a dynamic range of the echo signal received by the receiving module;

a pulse compressing module for outputting a pulse-compressed echo signal, wherein the pulse compression is performed by a correlation calculation between the echo signal having the dynamic range extended by the compensating module, and the reference signal; and a BT product extending module for extending only T, or both T and B of the BT product of the echo signal for the correlation calculation, wherein B is a frequency sweep width, and T is a pulse width, wherein the signal generating module generates a reference signal that changes frequency in a same manner as a BT product extended signal, and has approximately the same pulse width as that of the BT product extended signal, the BT product extended signal being a resultant signal where the BT product of the transmitting signal is extended in the same manner as the extension of the BT product.

3. A pulse signal transmitting/receiving device, comprising:

a signal generating module for generating a transmitting signal including an amplitude-modulated chirp signal having a frequency that changes, and a reference signal including a chirp signal having a frequency that changes;

a transmitting module for transmitting a pulse having approximately the same waveform as that of the transmitting signal;

a receiving module for receiving an echo signal that is the transmitting pulse reflected from a detection target object;

a compensating module for extending a dynamic range of the echo signal received by the receiving module;

a pulse compressing module for outputting a pulse-compressed echo signal, wherein the pulse compression is performed by a correlation calculation between the echo signal having the dynamic range extended by the compensating module, and the reference signal; and a BT product extending module for extending only B of the BT product of the echo signal for the correlation calculation, wherein B is a frequency sweep width, and T is a pulse width, wherein the signal generating module generates a reference signal that changes frequency in a same manner as a BT product extended signal, and has approximately the same pulse width as that of the BT product extended signal, the BT product extended signal being a resultant signal where the BT product of the transmitting signal is extended in the same manner as the extension of the BT product.

4. A pulse signal transmitting/receiving device, comprising:

a signal generating module for generating a transmitting signal including an amplitude-modulated chirp signal having a frequency that changes, and a reference signal including a chirp signal having a frequency that changes;

a transmitting module for transmitting a pulse having approximately the same waveform as that of the transmitting signal;

a receiving module for receiving an echo signal that is the transmitting pulse reflected from a detection target object;

a compensating module for extending a dynamic range of the echo signal received by the receiving module;

a pulse compressing module for outputting a pulse-compressed echo signal, wherein the pulse compression is performed by a correlation calculation between the echo signal having the dynamic range extended by the compensating module, and the reference signal; and a BT product extending module for extending only T, or both T and B of the BT product of the echo signal for the correlation calculation, wherein B is a frequency sweep width, and T is a pulse width, wherein the signal generating module generates a reference signal that changes frequency in a same manner as a BT product extended signal, and has approximately the same pulse width as that of the BT product extended signal, the BT product extended signal being a resultant signal where the BT product of the transmitting signal is extended in the same manner as the extension of the BT product, wherein if the BT product extended signal and the reference signals have the same dynamic range, the BT product extended signal and the reference signals are amplitude-modulated chirp signals having a similar waveform, wherein the dynamic range of the reference signal is greater than that of the BT product extended signal.

* * * * *